US010335983B2

(12) United States Patent
Hall et al.

(10) Patent No.: US 10,335,983 B2
(45) Date of Patent: Jul. 2, 2019

(54) OUT-OF-AUTOCLAVE COMPRESSION MOLDING

(71) Applicants: David R. Hall, Provo, UT (US);
Stephen R. Hall, Draper, UT (US);
Christopher Johnson, Provo, UT (US);
Jason Simpson, Provo, UT (US)

(72) Inventors: David R. Hall, Provo, UT (US);
Stephen R. Hall, Draper, UT (US);
Christopher Johnson, Provo, UT (US);
Jason Simpson, Provo, UT (US)

(73) Assignee: Hall Labs LLC, Provo, UT (US)

( * ) Notice: Subject to any disclaimer, the term of this patent is extended or adjusted under 35 U.S.C. 154(b) by 277 days.

(21) Appl. No.: 15/217,021

(22) Filed: Jul. 22, 2016

(65) Prior Publication Data

US 2018/0021990 A1  Jan. 25, 2018

(51) Int. Cl.
*B29C 43/56* (2006.01)
*B29C 43/36* (2006.01)
*B29C 70/44* (2006.01)
*B29L 31/00* (2006.01)

(52) U.S. Cl.
CPC .......... *B29C 43/3642* (2013.01); *B29C 70/44* (2013.01); *B29C 2043/3644* (2013.01); *B29C 2043/562* (2013.01); *B29L 2031/757* (2013.01)

(58) Field of Classification Search
None
See application file for complete search history.

(56) References Cited

U.S. PATENT DOCUMENTS 4,421,589 A * 12/1983 Armini ................... B32B 39/00
100/319
6,017,484 A *  1/2000 Hale ..................... B29C 70/342
156/286

* cited by examiner

*Primary Examiner* — Monica A Huson

(57) ABSTRACT

An out-of-autoclave compression molding system is disclosed herein. The system includes a mold, a vacuum bag, a vacuum valve, a pressure plate, and a pressure valve. The mold includes a concave feature and a flange. The vacuum bag covers at least the concave feature. The pressure plate is positioned outside the vacuum bag clamped to the flange and on the mold to form a pressure cavity between the vacuum bag and the plate. An out-of-autoclave compression molding process is also described. The process includes pressing a composite material and thermoset resin into a mold having a flange; surrounding the mold, composite material, and resin with a vacuum bag; sealing and evacuating the vacuum bag; clamping a pressure plate to the flange; and pressurizing the cavity.

16 Claims, 11 Drawing Sheets

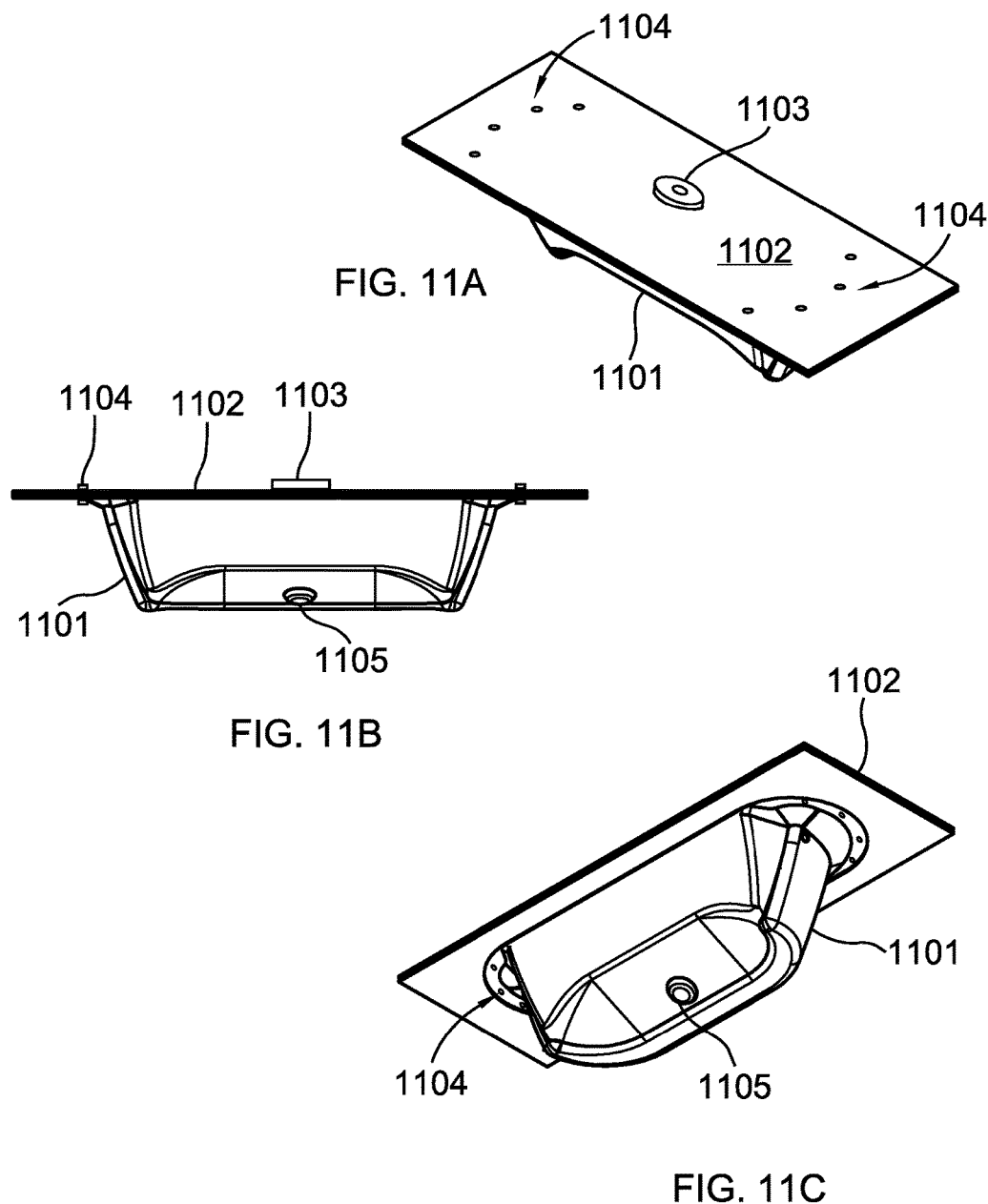

OUT-OF-AUTOCLAVE COMPRESSION MOLDING

TECHNICAL FIELD

This invention relates generally to the field of molded component fabrication, and more specifically to out-of-autoclave compression molding.

BACKGROUND

Carbon fiber compression molding has enabled rapidly deployable, strong, flexibly configured structures. However, the process can be arduous and expensive. For example, many processes require external pressure in an autoclave to sufficiently force a composite material against a mold. However, autoclaves are prohibitively expensive. One solution has been to seal a mold and the composite in a vacuum bag and evacuate the bag, so the bag exerts pressure on the composite, forcing it into the mold. However, even when the bag is fully evacuated, such that it exerts a pressure equal to atmospheric pressure on the composite, this pressure in many cases is not enough to force and hold the composite into the mold. Bubbling of a vacuum bag is also a significant issue. Thus, there is a need for an inexpensive and effective way to press a composite into a mold when pressure from a vacuum bag is insufficient.

SUMMARY OF THE INVENTION

An out-of-autoclave compression molding system is described that overcomes many of the shortcomings in the art described above. In general, the system includes a concave mold and a pressure plate. Composite material is molded into the concave portion, and the mold and composite are wrapped with a vacuum bag. The vacuum bag is evacuated, thereby pressing the composite into the mold with a pressure approximately equal to an ambient atmospheric pressure. The pressure place is then clamped to the mold over the concave portion of the mold, forming a cavity. The cavity is pressurized, increasing the pressure on the mold. If the composite includes a thermoset resin, it is cured in an oven.

The general embodiment described above addresses several issues. First, the system is easily deployable with current compression molding systems. The additional pressure created in the pressure cavity ensures more even pressure across the entire composite during curing. Additionally, the system is a fraction the cost of an autoclave.

In one embodiment, an out-of-autoclave compression molding system is disclosed herein. The system includes a mold, a vacuum bag, a vacuum valve, a pressure plate, and a pressure valve. The mold includes a concave feature and a flange. The vacuum bag covers at least the concave feature and forms an air-tight seal between the vacuum bag and the mold. The vacuum valve includes a vacuum end positioned between the mold and the vacuum bag. The pressure plate is positioned outside the vacuum bag clamped to the flange and on the mold to form a pressure cavity between the vacuum bag and the plate. The pressure valve includes a pressure end positioned between the pressure plate and the vacuum bag within the pressure cavity.

An out-of-autoclave compression molding process is also disclosed. The process includes pressing a composite material and thermoset resin into a mold having a flange and surrounding the mold, composite material, and resin with a vacuum bag. The process further includes sealing and evacuating the vacuum bag such that a pressure exerted by the bag on the composite and resin ranges from 5 to 20 psi. The process also includes clamping a pressure plate to the flange. The plate is positioned on the mold to form a pressure cavity between the mold and the plate, and the composite material and resin is disposed in the cavity between the mold and the plate. The process additionally includes pressurizing the cavity.

BRIEF DESCRIPTION OF THE DRAWINGS

A more particular description of the invention briefly described above is made below by reference to specific embodiments. Several embodiments are depicted in drawings included with this application, in which:

FIGS. 11A-C depict several views of a specific embodiment of an out-of-autoclave compression molding system in accordance with the present invention.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch+/−0.5 inch."

The descriptions of the various embodiments include, in some cases, references to elements described with regard to other embodiments. Such references are provided for convenience to the reader, and are not intended to limit the described elements to only the features described with regard to the other embodiments. Rather, each embodiment is distinct from each other embodiment.

Figure 1:
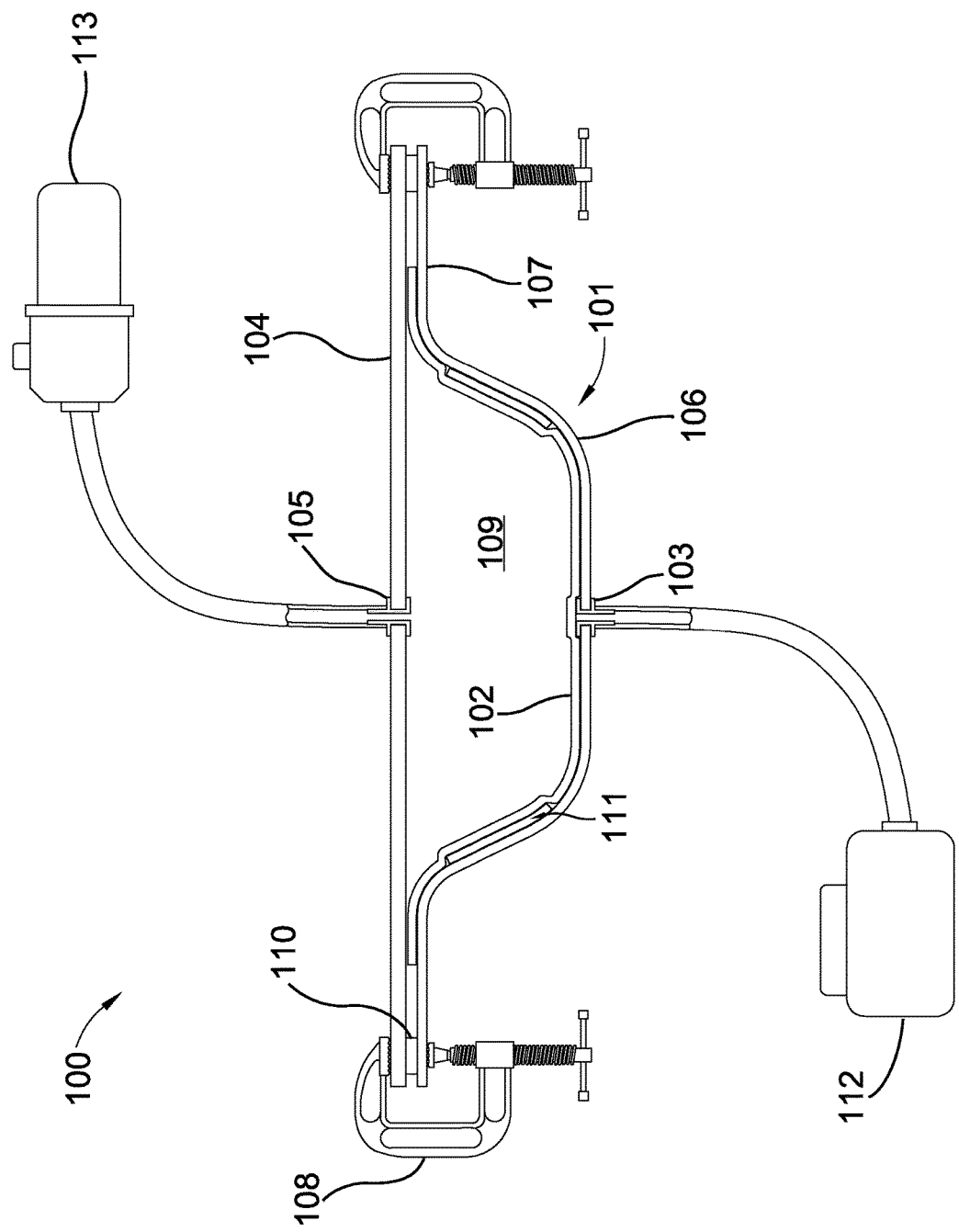
FIG. 1 depicts a cutout side view of one embodiment of an out-of-autoclave compression molding system.

FIG. 1 depicts a cutout side view of one embodiment of an out-of-autoclave compression molding system. System 100 includes mold 101, vacuum bag 102, vacuum valve 103, pressure plate 104, and pressure valve 105. Mold 101 includes concave feature 106 and flange 107. Vacuum bag 102 covers concave feature 106, and an air-tight seal is formed between vacuum bag 102 and mold 101. Vacuum valve 103 includes a vacuum end positioned between mold 101 and vacuum bag 102. Pressure plate 104 is outside vacuum bag 102 and clamped to flange 107, for example by c-clamps 108. Plate 104 is positioned on mold 101 to form pressure cavity 109 between vacuum bag 102 and plate 104. Pressure valve 105 includes a pressure end positioned between plate 105 and vacuum bag 105 within pressure cavity 109.

Mold 101 is a female mold made of any of a variety of typical mold materials, such as carbon fiber/epoxy, monolithic graphite, castable graphite, ceramics, and/or metals such as aluminum or steel. In some embodiments where mold 101 is to be heated, mold 101 is made of a material with a coefficient of thermal expansion similar to the material being molded. Vacuum bag 102 is made of any of a variety of typical materials used for vacuum bags in known compression molding techniques. For example, in some embodiments, vacuum bag 102 is a single use vacuum bag. Vacuum valve 103 is any of a variety of through-bag valves, such as stainless steel or brass. Alternatively, in some embodiments, vacuum valve 103 is plastic. Pressure plate 104 is a planar, high-tensile strength plate. In one embodiment, pressure plate 104 is a laser-cut aluminum plate. In another embodiment, plate 104 is a hard plastic. In yet another embodiment, plate 104 is steel. Plate 104 has a thickness ranging from ¼-inch to 2 inches. Pressure valve 105 is any of a variety of valves, such as a stainless steel or brass. Alternatively, in some embodiments, pressure valve 105 is plastic.

Mold 101 is used for forming structures out of composite and/or thermoset materials. Composite and thermoset resin 111, such as prepreg carbon fiber, is pressed into mold 101. Vacuum bag 102 is placed over composite 111 such that composite 111 is positioned between vacuum bag 102 and mold 101. Vacuum bag 102 is adhered to mold 101, forming an air-tight seal. For example, in one embodiment, vacuum bag 102 is adhered to mold 101 by a foam adhesive strip. In some embodiments, the foam adhesive strip doubles as a gasket to aid in forming an air-tight seal between plate 104 and mold 101. Plate 104 is clamped to mold 101, and cavity 109 is made air-tight by gasket 110. Valves 103, 105 pass partially through mold 101 and plate 104, respectively. Vacuum valve 103 is positioned on a bottom side of mold 101, and pressure valve 105 is positioned on a top side of pressure plate 104. Vacuum 112 is coupled to valve 103, and vacuum bag 102 is evacuated, forming a vacuum between vacuum bag 102 and composite 111, and further pressing composite 111 into mold 101. For example, in some embodiments, vacuum bag 102 is evacuated to between 10 and 40 in Hg below atmospheric pressure, where vacuum bag 102 exerts a pressure on composite 111 ranging between 5 and 20 psi. Compressor motor 113 is coupled to pressure valve 105, and cavity 109 is pressurized, ranging from 5 to 100 psi. In some embodiments, plate 104 includes a groove for gasket 110 so that gasket 110 is not blown out by the pressure in cavity 109. The pressure on composite 111 is thereby increased by the pressure in cavity 109.

In some embodiments, valves 103, 105 are threaded into mold 101 and plate 104, respectively, and sealed using gaskets. In other embodiments, valve 105 is welded to pressure plate 104. In yet other embodiments, though not depicted, valve 103 is part of, or formed out of, mold 101. Composite 111 is any of a variety of moldable composite materials that set to from a rigid structure. For example, in embodiment, composite 111 is prepreg carbon fiber. In another embodiment, composite 111 is fiberglass with a thermoset resin.

Figure 2:
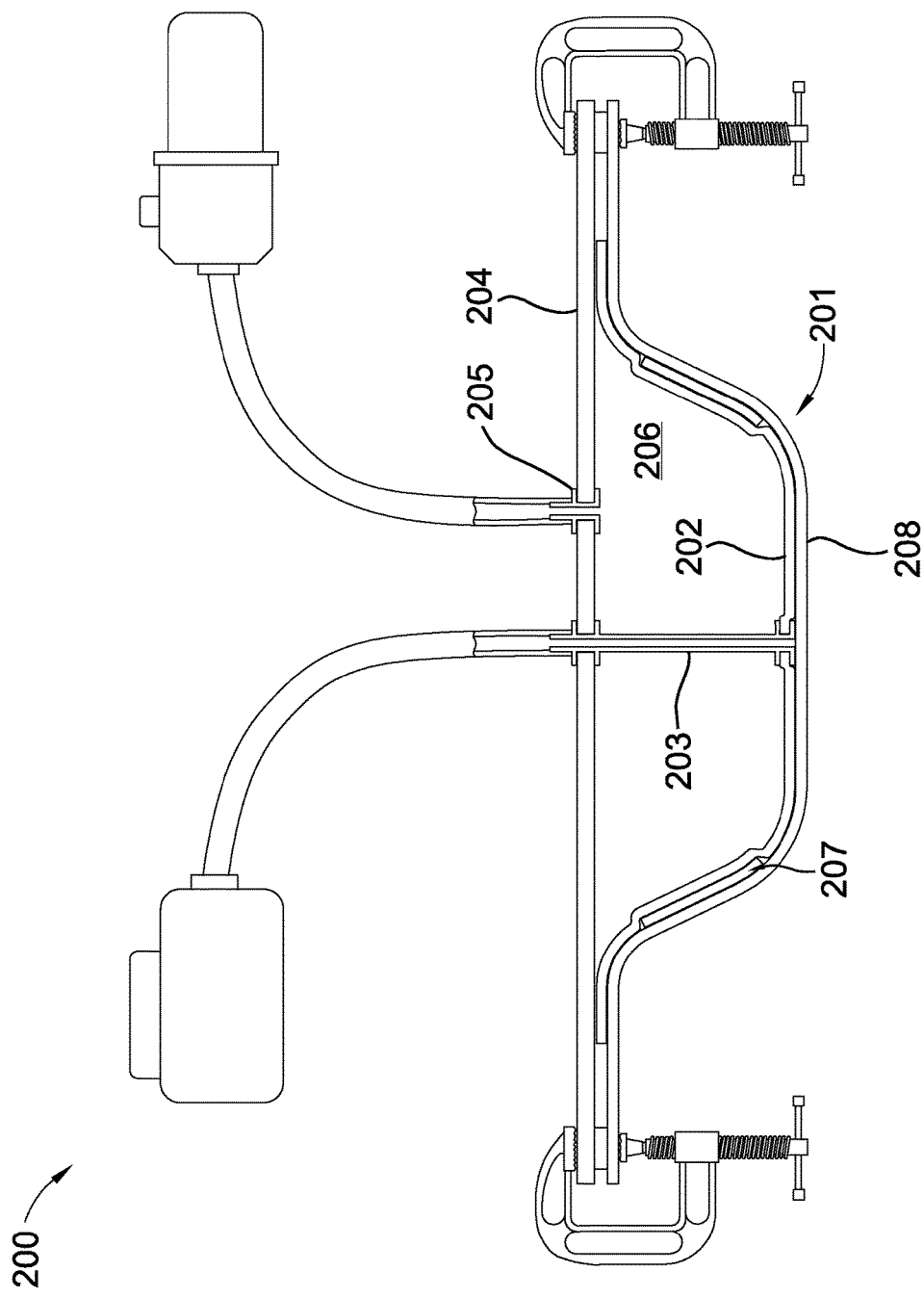
FIG. 2 depicts another cutout side view of an out-of-autoclave compression molding system.

FIG. 2 depicts another cutout side view of an out-of-autoclave compression molding system. Similar to system 100, system 200 includes mold 201, vacuum bag 202, vacuum valve 203, pressure plate 204, pressure valve 205, and cavity 206. However, in system 200, a vacuum pump end of vacuum valve 203 passes through cavity 206 and pressure plate 204. In such embodiments, mold 201 does not include a cutout for valve 203. Such embodiments are useful when, for example, it is beneficial or convenient to leave mold 201 in-tact, such as when composite 207 covers substantially all of concave feature 208 of mold 201 (not shown). However, in any such embodiment, it is useful to cover a portion of mold 201 not including composite 207 with vacuum bag 202 so that vacuum valve 203 does not press into and deform composite 207.

Figure 3:
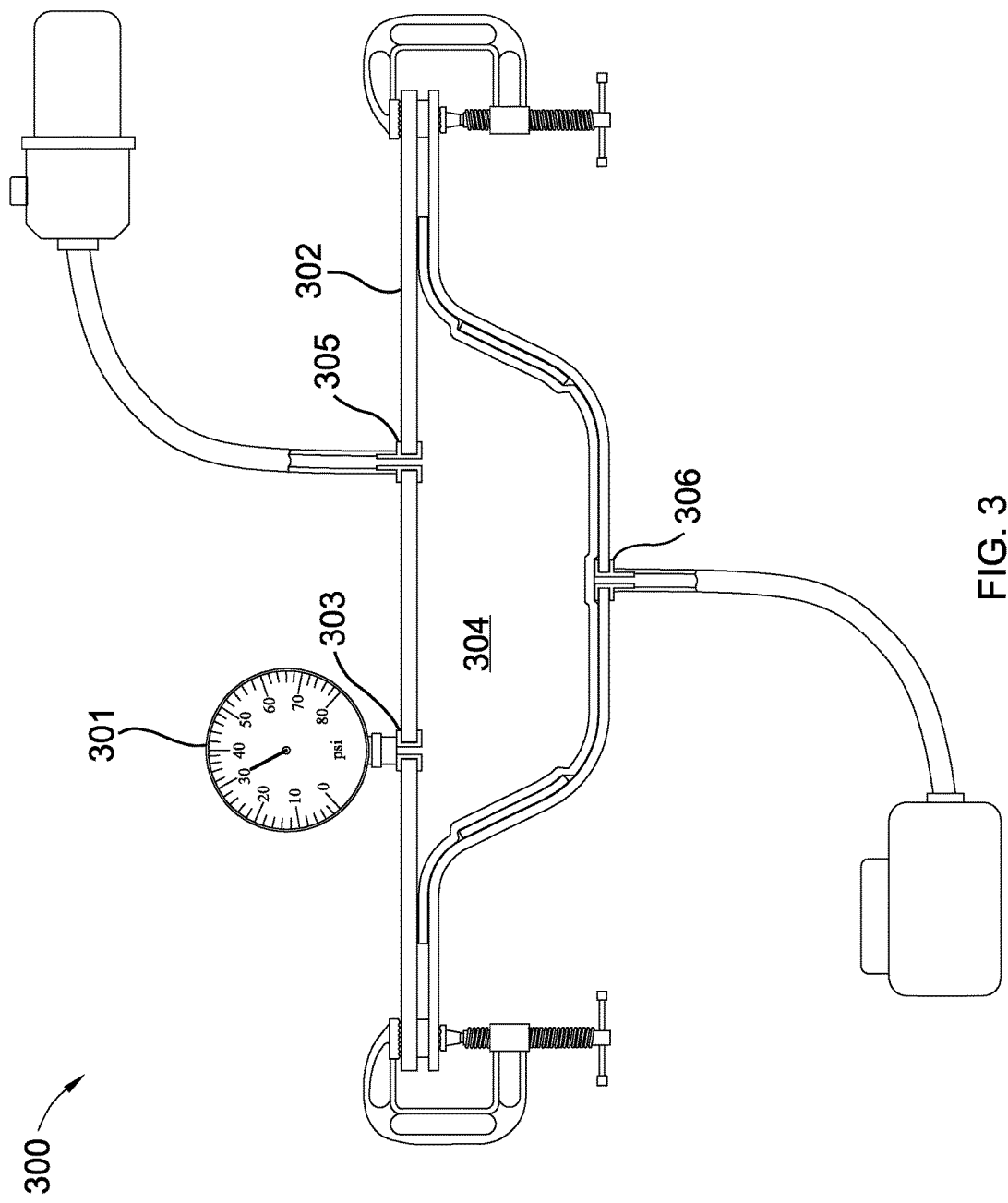
FIG. 3 depicts yet another cutout side view of an out-of-autoclave compression molding system.

FIG. 3 depicts another cutout side view of an out-of-autoclave compression molding system. System 300 is similar to those discussed above in FIGS. 1 and 2, however system 300 includes pressure gauge 301. As shown in the depicted embodiment, pressure gauge 301 passes through pressure plate 302 via pressure gauge valve 303 and measures an air pressure inside cavity 304.

Figure 4:
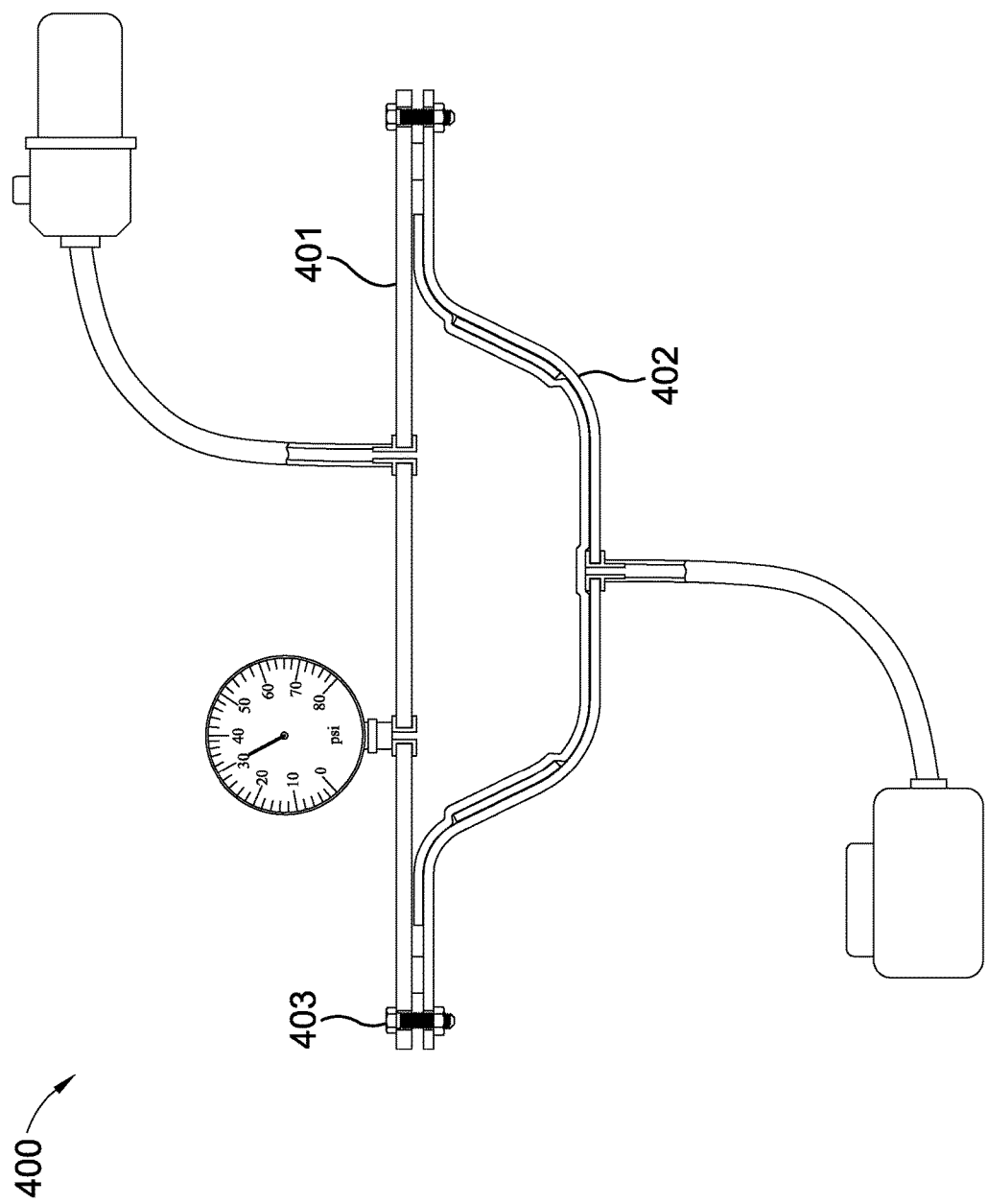
FIG. 4 depicts a side cutout view of an out-of-autoclave compression molding system similar FIG. 3, with nuts and bolts clamping the pressure plate to the flange.

FIG. 4 depicts a side cutout view of an out-of-autoclave compression molding system similar FIG. 3, with nuts and bolts clamping the pressure plate to the flange. As shown in system 400, plate 401 is clamped to mold 402 by nuts and bolts 403.

Figure 5:
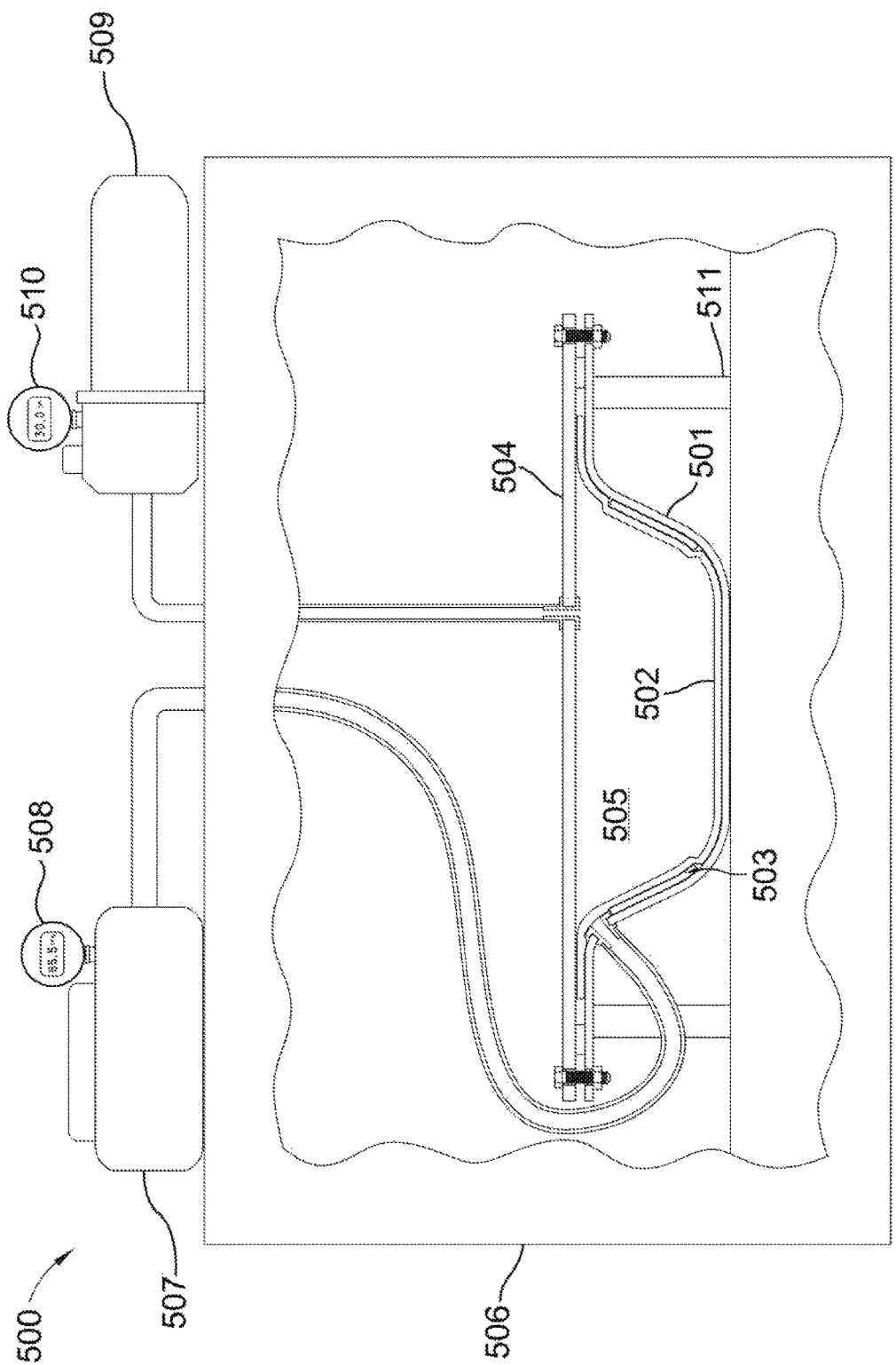
FIG. 5 depicts an out-of-autoclave compression molding system including an oven for curing a thermoset composite.

FIG. 5 depicts an out-of-autoclave compression molding system including an oven for curing a thermoset composite. System 500 includes mold 501, vacuum bag 502, thermoset composite 503, pressure plate 504, cavity 505, all of which are contained in oven 506. Oven 506 includes vacuum pump 507 with pressure gauge 508, and compressor motor 509 with pressure gauge 510, all of which are used to maintain and monitor pressure on composite 503 while composite 503 cures in oven 506. Pressure plate 504 is clamped to mold 501. Vacuum pump 507 evacuates air from between vacuum bag 502 and composite 503, and compressor motor 509 pressurizes cavity 505. Oven 506 is heated to a temperature ranging from 150 F to 300 F, and composite 503 cures in oven 506. In some embodiments, oven 506 also includes stands 511 that support mold 501 while composite 503 cures.

Figure 6:
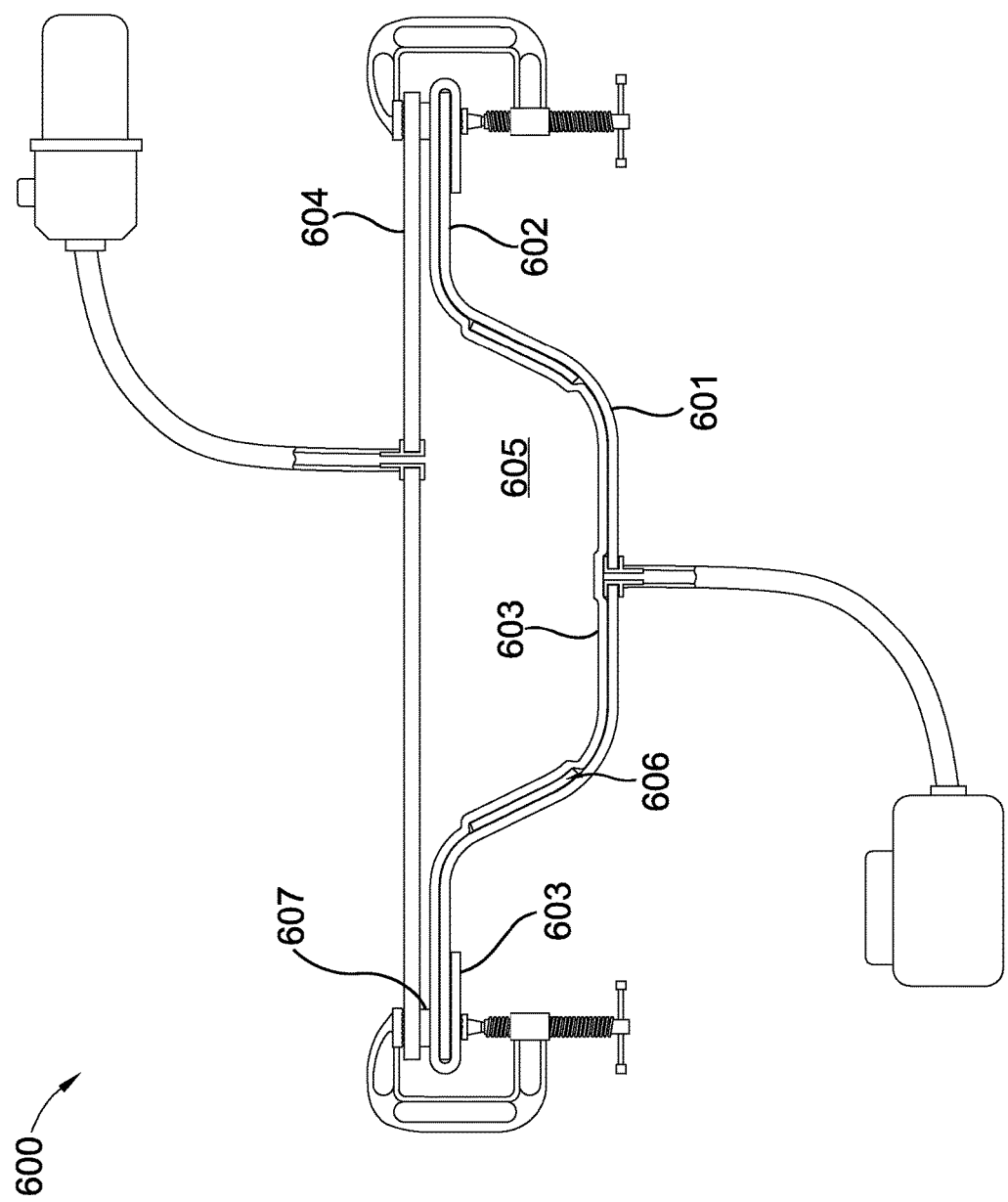
FIG. 6 depicts one alternative embodiment of a vacuum bag for use with an out-of-autoclave system.

FIG. 6 depicts one alternative embodiment of a vacuum bag for use with an out-of-autoclave system. System 600 includes mold 601 with flanges 602, vacuum bag 603, pressure plate 604, pressure cavity 605, and composite material 606. Vacuum bag 603 wraps around flanges 602 between flanges 602 and plate 604. In some embodiments, vacuum bag 603 is adhered to an underside of flanges 602. In other embodiments, vacuum bag is adhered to flanges 602 between flanges 602 and plate 604. For example, in some such embodiments, a foam adhesive strip is used to adhere vacuum bag 603 to flanges 602. In some embodiments that include the foam adhesive strip, as described above, the strip doubles as a gasket to ensure an air-tight seal between vacuum bag 603 and pressure plate 604. In other embodiments, such as the depicted embodiment, gasket 607 is positioned between vacuum bag 603 and plate 604 to ensure an air-tight seal.

Figure 7:
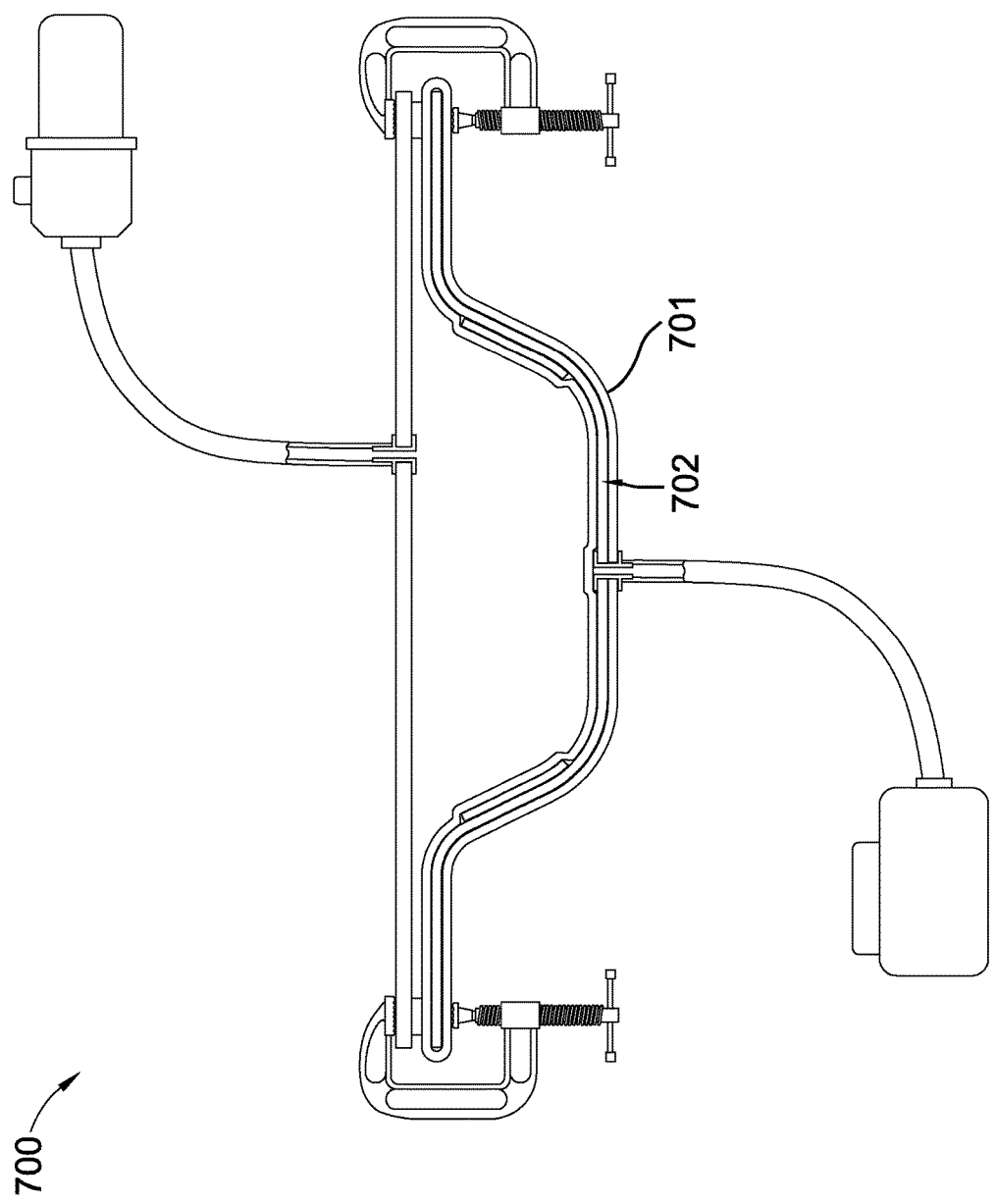
FIG. 7 depicts another alternative embodiment of a vacuum bag for use with an out-of-autoclave system.

FIG. 7 depicts another alternative embodiment of a vacuum bag for use with an out-of-autoclave system. System 700 is similar to system 600 described above, except, as shown, vacuum bag 701 completely surrounds mold 702.

Figure 8:
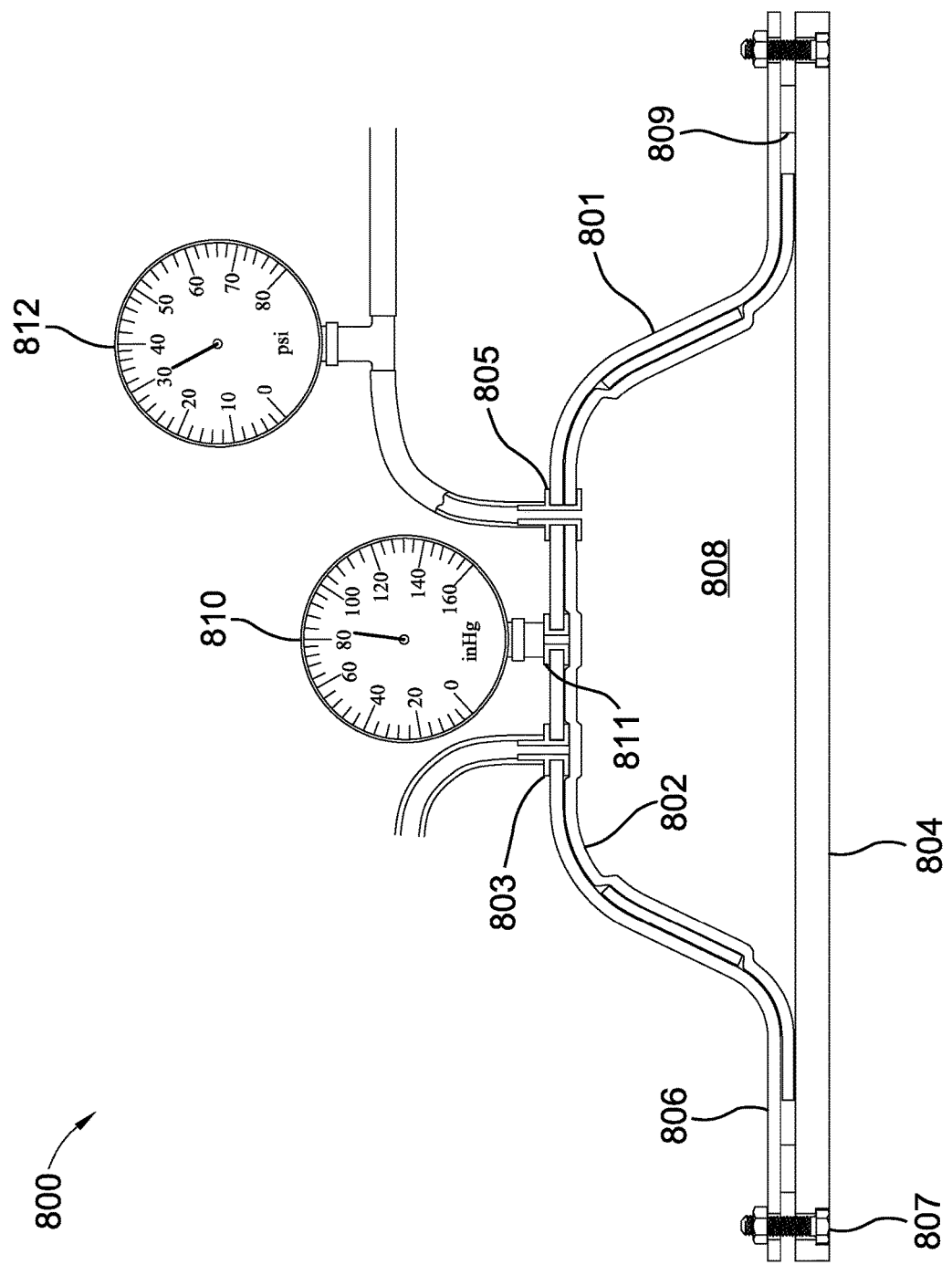
FIG. 8 depicts an embodiment of an out-of-autoclave compression molding system where a pressure plate acts as a base and a composite material is pressed up, against gravity, into a mold.

FIG. 8 depicts an embodiment of an out-of-autoclave compression molding system where a pressure plate acts as a base and a composite material is pressed up, against gravity, into a mold. System 800 includes mold 801, vacuum bag 802, pressure plate 803, pressure cavity 804, pressure valve 805, and pressure gauges 806, 807. As depicted, pressure valve 805 passes through mold 801 and vacuum bag 802 into cavity 804. Pressure gauge 807 is coupled to pressure valve 805 and measures an air pressure in cavity 804. Pressure gauge 806 passes through mold 801 and measures an air pressure between mold 801 and vacuum bag 802. Such an embodiment is beneficial, for example, for use in conjunction with the embodiment depicted in FIG. 2, in environments where space is limited and several composites are cured simultaneously in a small space. The embodiments of FIGS. 2 and 8 are easily overlapped, saving space, and allowing for many composites to be cured in a small space.

Figure 9:
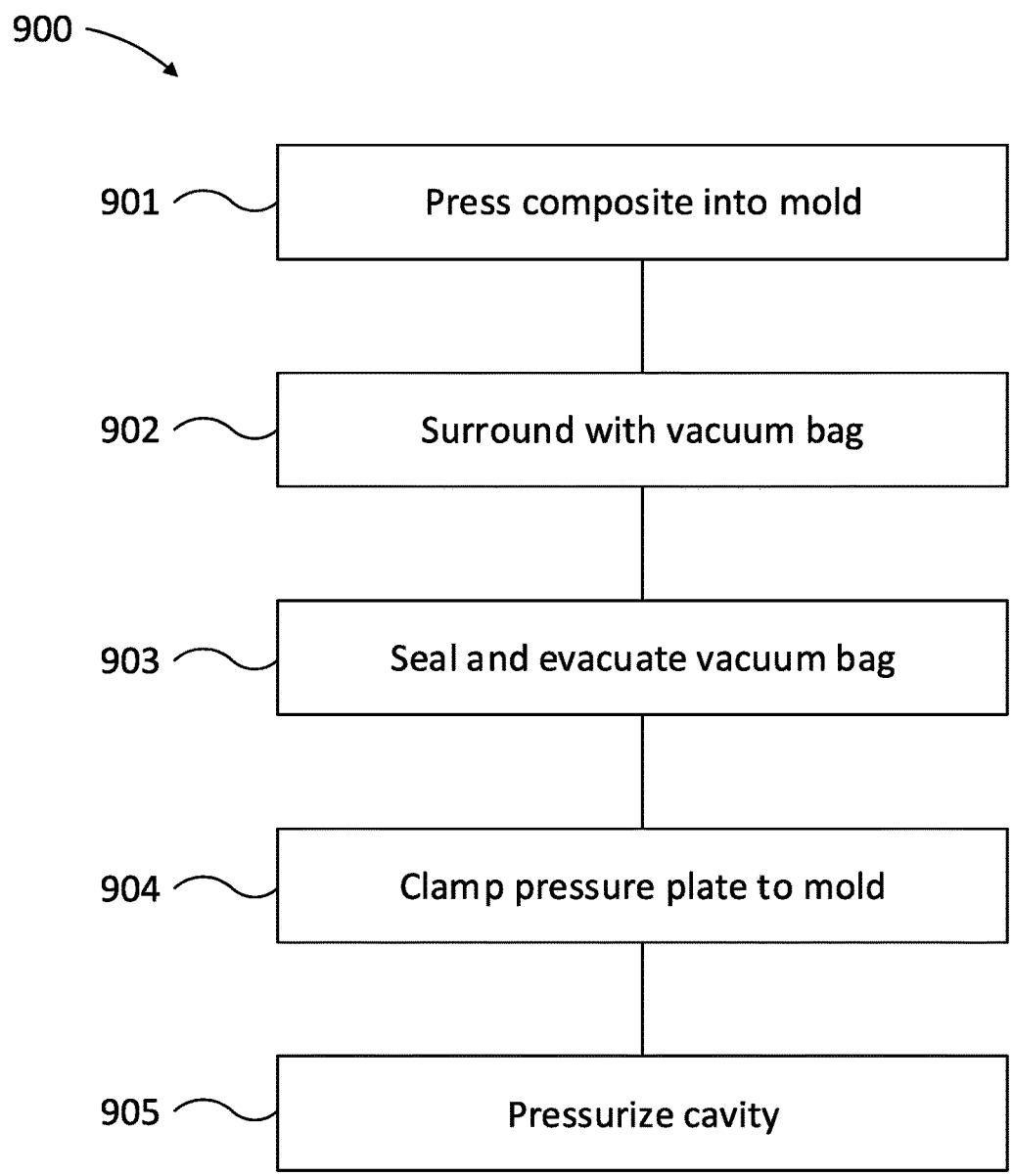
FIG. 9 depicts one embodiment of an out-of-autoclave compression molding process.

FIG. 9 depicts one embodiment of an out-of-autoclave compression molding process. Method 900 includes, at block 901, pressing a composite material and thermoset resin into a mold that has a flange. At block 902, the mold, composite material, and resin are surrounded with a vacuum bag. At block 903, the vacuum bag is sealed and evacuated such that a pressure exerted by the bag on the composite and resin ranges from 5 to 20 psi. At block 904, a pressure plate is clamped to the flange. The plate is positioned on the mold to form a pressure cavity between the mold and the plate. The composite material and resin is disposed in the cavity between the mold and the plate. At block 905, the cavity is pressurized, further pressing the composite and resin into the mold. For example, in some embodiments, the cavity is pressurized to a pressure ranging from 5 to 100 psi. Subsequently, the mold is placed in an oven, and the composite and resin are left to cure.

The mold, composite, vacuum bag, pressure plate, and cavity are all similar to that described above with regard to FIGS. 1-8. The composite and thermoset resin are pressed into the mold by any of a variety of ways. For example, in one embodiment, the composite and resin are pressed into the mold by hand. In other embodiments, the composite and resin are brushed into the mold. In yet other embodiments, the composite and resin are pressed into the mold by a machine. Surrounding the mold, composite, and resin is done according to any of the ways discussed above with regard to FIGS. 1-8. Similarly, sealing and evacuating the vacuum bag, clamping the pressure plate to the mold, and pressurizing the cavity are all done according to any of the ways discussed above with regard to FIGS. 1-8.

Figure 10:
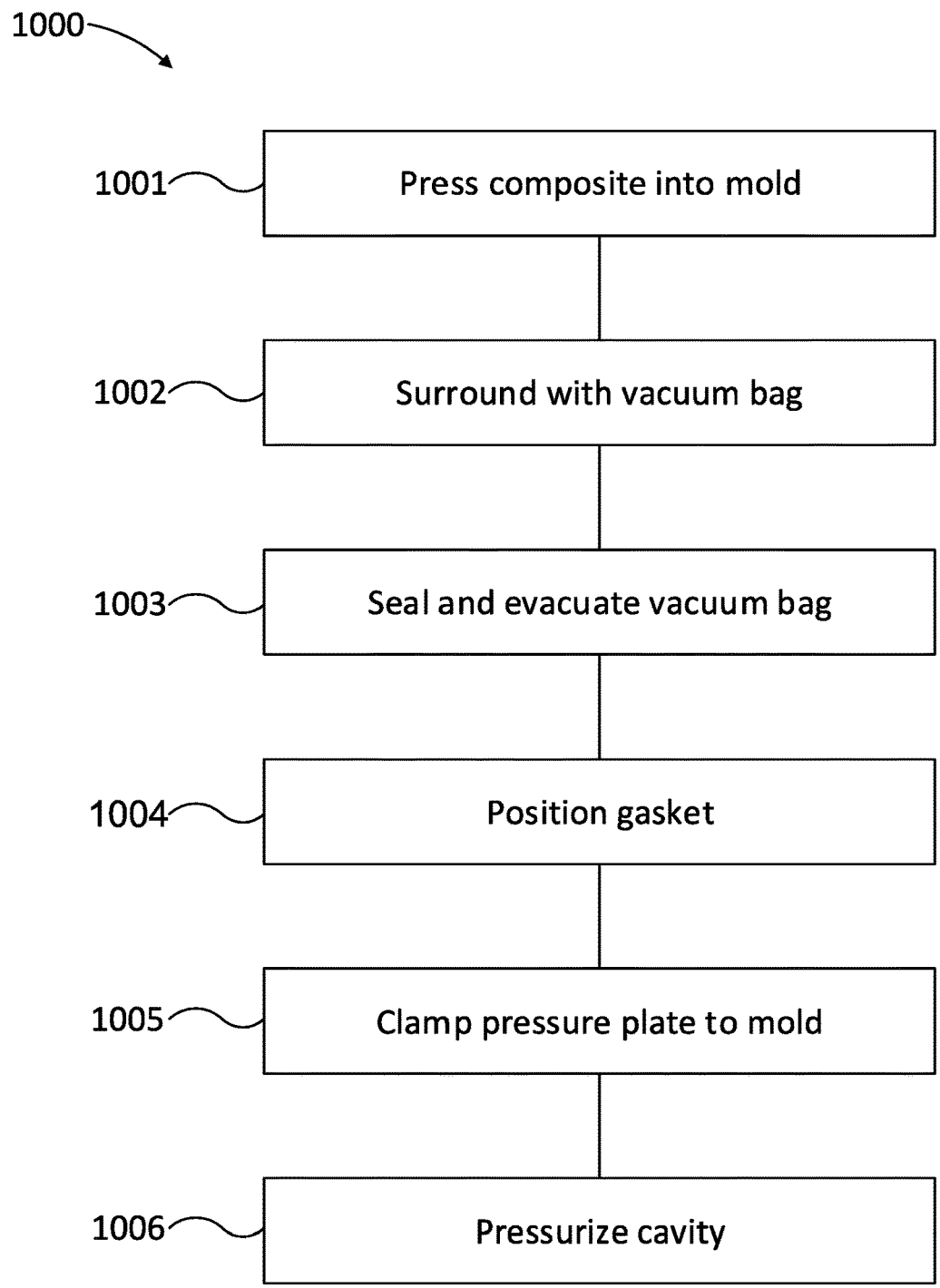
FIG. 10 depicts another out-of-autoclave compression molding process according to the claimed invention, further including positioning a gasket between a pressure plate and a mold.

FIG. 10 depicts another out-of-autoclave compression molding process according to the claimed invention, further including positioning a gasket between a pressure plate and a mold. Method 1000 includes, at block 1001, pressing a composite material and thermoset resin into a mold that has a flange. At block 1002, the mold, composite material, and resin are surrounded with a vacuum bag. At block 1003, the vacuum bag is sealed and evacuated such that a pressure exerted by the bag on the composite and resin ranges from 5 to 20 psi. At block 1004, a gasket is positioned between the plate and the mold. At block 1005, a pressure plate is clamped to the flange. The plate is positioned on the mold to form a pressure cavity between the mold and the plate. The composite material and resin is disposed in the cavity between the mold and the plate. At block 1005, the cavity is pressurized, further pressing the composite and resin into the mold. For example, in some embodiments, the cavity is pressurized to a pressure ranging from 5 to 100 psi. Subsequently, the mold is placed in an oven, and the composite and resin are left to cure.

FIGS. 11A-C depict several views of a specific embodiment of an out-of-autoclave compression molding system in accordance with the present invention. As shown, pressure plate 1102 is clamped to mold 1101 by nuts and bolts 1104. Pressure valve 1103 passes through pressure plate 1102, and vacuum valve 1105 passes through mold 1101.

The invention claimed is:

1. An out-of-autoclave compression molding system comprising:
   a mold comprising a concave feature and a flange;
   a vacuum bag covering at least the concave feature and forming an air-tight seal between the vacuum bag and the mold; and
   a vacuum valve with a vacuum end positioned between the mold and the vacuum bag and wherein the vacuum valve further comprises a vacuum pump end passing through the cavity and the pressure plate;
   a pressure plate outside the vacuum bag clamped to the flange, wherein the plate is positioned on the mold to form a pressure cavity between the vacuum bag and the plate; and
   a pressure valve with a pressure end positioned between the pressure plate and the vacuum bag within the pressure cavity.

2. The system of claim 1, wherein the pressure valve is positioned on a top side of the pressure plate.

3. The system of claim 1, wherein the vacuum bag wraps around the flange between the flange and the pressure plate.

4. The system of claim 1, further comprising an oven with a vacuum pump and a pressure pump, wherein the mold, vacuum bag and pressure plate are contained in the oven, and wherein the oven is heated, curing a composite pressed into the mold by the vacuum bag.

5. The system of claim 1, further comprising a composite material and thermoset resin positioned between the vacuum bag and the mold.

6. The system of claim 5, further comprising a vacuum between the vacuum bag and the composite material and thermoset resin, wherein the vacuum bag exerts a force on the composite material and thermoset resin ranging from 5-20 psi.

7. The system of claim 1, wherein a pressure in the pressure cavity ranges from 5-100 psi.

8. The system of claim 1, wherein the plate and flange form an air-tight seal.

9. The system of claim 1, further comprising c-clamps that clamp the plate to the flange.

10. The system of claim 1, further comprising one or more nuts and bolts that clamp the plate to the flange.

11. The system of claim 1, further comprising a pressure gauge.

12. The system of claim 11, wherein the pressure gauge passes through the plate and measures an air pressure inside the cavity.

13. The system of claim 11, wherein the pressure gauge is coupled to the pressure valve.

14. The system of claim 11, wherein the pressure gauge passes through the mold and measures an air pressure between the mold and the vacuum bag.

15. An out-of-autoclave compression molding system comprising:
- a mold comprising a concave feature and a flange;
- a vacuum bag covering at least the concave feature and forming an air-tight seal between the vacuum bag and the mold; and
- a vacuum valve with a vacuum end positioned between the mold and the vacuum bag and wherein the vacuum valve passes through the mold
- a pressure plate outside the vacuum bag clamped to the flange, wherein the plate is positioned on the mold to form a pressure cavity between the vacuum bag and the plate; and
- a pressure valve with a pressure end positioned between the pressure plate and the vacuum bag within the pressure cavity.

16. An out-of-autoclave compression molding system comprising:
- a mold comprising a concave feature and a flange;
- a vacuum bag covering at least the concave feature and forming an air-tight seal between the vacuum bag and the mold; and
- a vacuum valve with a vacuum end positioned between the mold and the vacuum bag;
- a pressure plate outside the vacuum bag clamped to the flange, wherein the plate is positioned on the mold to form a pressure cavity between the vacuum bag and the plate; and
- a pressure valve with a pressure end positioned between the pressure plate and the vacuum bag within the pressure cavity and wherein the pressure valve passes through the mold and the vacuum bag into the cavity.

* * * * *